(12) United States Patent
Feigenbaum et al.

(10) Patent No.: US 11,374,378 B2
(45) Date of Patent: Jun. 28, 2022

(54) SYSTEM AND METHOD FOR PLASMONIC CONTROL OF SHORT PULSES IN OPTICAL FIBERS

(71) Applicants: Lawrence Livermore National Security, LLC, Livermore, CA (US); Mikhail A. Noginov, Norfolk, VA (US)

(72) Inventors: Eyal Feigenbaum, Livermore, CA (US); Graham S. Allen, Pleasanton, CA (US); Jay W. Dawson, Livermore, CA (US); Mikhail A. Noginov, Norfolk, VA (US)

(73) Assignees: Lawrence Livermore National Security, LLC, Livermore, CA (US); Board of Visitors of Norfolk State University, Norfolk, VA (US)

( * ) Notice: Subject to any disclaimer, the term of this patent is extended or adjusted under 35 U.S.C. 154(b) by 0 days.

(21) Appl. No.: 16/999,714

(22) Filed: Aug. 21, 2020

(65) Prior Publication Data

US 2021/0057870 A1 Feb. 25, 2021

Related U.S. Application Data

(62) Division of application No. 16/037,837, filed on Jul. 17, 2018, now Pat. No. 10,756,503.

(51) Int. Cl.
*G02B 6/02* (2006.01)
*H01S 3/094* (2006.01)
(Continued)

(52) U.S. Cl.
CPC .... *H01S 3/094076* (2013.01); *G02B 6/02061* (2013.01); *G02B 6/1226* (2013.01);
(Continued)

(58) Field of Classification Search
CPC .............. G02B 6/02061; G02B 6/1226; H01S 3/094019
See application file for complete search history.

(56) References Cited

U.S. PATENT DOCUMENTS

| 5,444,723 A | 8/1995 | Chandonnet et al. |
| 2010/0226134 A1 | 9/2010 | Capasso et al. |

(Continued)

FOREIGN PATENT DOCUMENTS

WO WO-2018118807 A1 6/2018

OTHER PUBLICATIONS

Yan et al. "Metallic Grating on a D-Shaped Fiber for refractive index Sensing,"Oct. 2013, IEEE Photonics Journal, vol. 5, No. 5. (Year: 2013).

(Continued)

*Primary Examiner* — Michael Carter
(74) *Attorney, Agent, or Firm* — Harness, Dickey & Pierce, P.L.C.

(57) ABSTRACT

The present disclosure relates to an optical waveguide system. The system has a first waveguide having a core-guide and a cladding material portion surrounding and encasing the core-guide to form a substantially D-shaped cross sectional profile with an exposed flat section running along a length thereof. The core-guide enables a core-guide mode for an optical pulse signal having a first characteristic, travelling through the core-guide. A material layer of non-linear material is used which forms a second waveguide. The material layer is disposed on the exposed flat section of the cladding material portion. The material layer forms a plasmonic device to achieve a desired coupling with the core-guide to couple optical energy travelling through the core-guide into the material layer to modify the optical energy travelling through the core-guide such that the optical (Continued)

energy travelling through the core-guide has a second characteristic different from the first characteristic.

16 Claims, 5 Drawing Sheets

(51) Int. Cl.
  *H01S 3/067* (2006.01)
  *H01S 3/0941* (2006.01)
  *G02B 6/122* (2006.01)

(52) U.S. Cl.
  CPC ........ *H01S 3/06725* (2013.01); *H01S 3/0941* (2013.01); *H01S 3/094019* (2013.01)

(56) References Cited

U.S. PATENT DOCUMENTS

| | | | |
|---|---|---|---|
| 2011/0128614 A1 | 6/2011 | Blumberg et al. | |
| 2012/0279051 A1 | 11/2012 | Zhou et al. | |
| 2013/0100456 A1* | 4/2013 | Yu | G01B 9/02082 356/479 |
| 2015/0355040 A1 | 12/2015 | Sirbuly et al. | |
| 2018/0143133 A1* | 5/2018 | Viegas | G01N 21/7703 |

OTHER PUBLICATIONS

International Search Report and Written Opinion in corresponding International Patent Application No. PCT/US2019/042266 dated Nov. 8, 2019, 11 pp.

Dyott, R. B. et al. "Indium-coated D-shaped-fiber polarizer," Opt. Lett., vol. 12, Issue 4, 1987, pp. 287-289.

Pruneri, V. et al. "Greater than 20%-efficient frequency doubling of 1532-nm nanosecond pulses in quasi-phase-matched germanosilicate optical fibers,"Opt. Lett., vol. 24, Issue 4, 1999, pp. 208-210.

Homola, J. et al. "Surface plasmon resonance sensors: review," Sensors and Actuators B: Chemical, vol. 54, Issue 1-2, 1999, pp. 3-15.

DeSalvo, R. et al. "Self-focusing and self-defocusing by cascaded second-order effects in KTP," Opt. Lett., vol. 17, No. 1, 1992, pp. 28-30.

Capasso, F. et al. "Using Plasmonics to Shape Light Beams," Optics and Photonics News, vol. 20, 2009, pp. 22-27.

Morita, T. et al. "High-Efficient and Reliable Broad-Area Laser Diodes With A Window Structure," IEEE J. Sel. Top. Quant. Electron., vol. 19, Issue 4, 2013, 1502104.

Shapira, O. et al. "Towards Dynamic Surface-Emitting Fiber Lasers," Optics and Photonics News, vol. 18, Issue 5, May 2007, pp. 26-31.

Extended European Search Report regarding European Patent Application No. 19838023.3, dated Feb. 17, 2022.

Herda, R. et al. "Efficient side-pumping of fibre lasers using binary gold diffraction gratings", Electronics Letters, IEE Stevenage, GB, vol. 39, No. 3, Feb. 6, 2003 (Feb. 6, 2003), pp. 276-277.

Huang, Chieh-Wei et al. "Distributed 100-W side launching by using single laser diode stack", Lasers and Electro-Optics (CLEO), 2012 Conference ON, IEEE, May 6, 2012 (May 6, 2012), pp. 1-2.

Allsop, Thomas D. P. et al. "Formation and Characterization of Ultra-Sensitive Surface Plasmon Resonance Sensor Based Upon a Nano-Scale Corrugated Multi-Layered Coated D-Shaped Optical Fiber", IEEE Journal of Quantum Electronics, IEEE, USA, vol. 48, No. 3, Mar. 1, 2012 (Mar. 1, 2012), pp. 394-405.

Arango, Felipe Bernal et al. "Plasmonic Antennas Hybridized with Dielectric Waveguides", ACS Nano, vol. 6, No. 11, Nov. 27, 2012 (Nov. 27, 2012), pp. 10156-10167.

* cited by examiner

SYSTEM AND METHOD FOR PLASMONIC CONTROL OF SHORT PULSES IN OPTICAL FIBERS

CROSS-REFERENCE TO RELATED APPLICATIONS

This application is a divisional and claims priority of U.S. patent application Ser. No. 16/037,837 filed on Jul. 17, 2018. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to optical fibers, and more particularly to systems and methods for controlling optical fiber properties through the use of plasmonic structures formed or secured on an optical fiber.

BACKGROUND

This section provides background information related to the present disclosure which is not necessarily prior art.

Plasmonic light-waves are electromagnetic waves propagating on metal surfaces coupled with surface electron oscillations. The coupling to electron oscillations enables extreme modifications to the propagating light, but this comes at a price of enhanced attenuation. However, careful design of complex metal-optic structures is a key-enabler for many ground breaking technologies. Merging plasmonics and optical fiber technologies has been previously explored, but primarily for sensing applications.

SUMMARY

This section provides a general summary of the disclosure, and is not a comprehensive disclosure of its full scope or all of its features.

In one aspect the present disclosure relates to an optical waveguide system. The system may include a first waveguide having a core-guide and a cladding material portion surrounding and encasing the core-guide. The cladding material portion forms a substantially D-shaped cross sectional profile with an exposed flat section running along a length thereof. The core-guide enables a core-guide mode for an optical pulse signal having a first characteristic, travelling through the core-guide. A material layer of non-linear material is included for forming a second waveguide. The material layer is disposed on the exposed flat section of the cladding material portion. The material layer forms a plasmonic device to achieve a desired coupling with the core-guide to couple optical energy travelling through the core-guide into the material layer, such that the optical energy travelling through the core-guide has a second characteristic different from the first characteristic.

In another aspect the present disclosure relates to a surface emitting optical fiber. The surface emitting optical fiber may include an optical fiber forming a first waveguide, and having a core-guide and a cladding material portion surrounding and encasing the core-guide. The core-guide enables a core-guide mode for an optical signal having a first pulse profile travelling through the core-guide. A second waveguide is secured to an outer surface of the first waveguide. The second waveguide forms a plasmonic device which implements a plasmonic mode waveguide. The construction of the second waveguide is such as to achieve a desired level of coupling between the core-guide mode and the plasmonic mode waveguide such that optical energy coupled into the second waveguide results in a second pulse profile being different from the first pulse profile, which is emitted out from the second waveguide.

In still another aspect the present disclosure relates to a method for transmitting optical energy. The method comprises injecting optical energy forming a pulse having a first temporal pulse profile into a core-guide of an optical fiber. The core-guide forms a first waveguide, and the optical fiber has a cladding material portion with a D-shaped profile. The method further includes using a non-linear material layer secured to the D-shaped profile of the cladding material portion to form a second waveguide. The second waveguide couples at least a portion of the optical energy out from the first waveguide such that the optical energy travelling through the first waveguide is modified to have a second temporal pulse profile different from the first temporal pulse profile.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
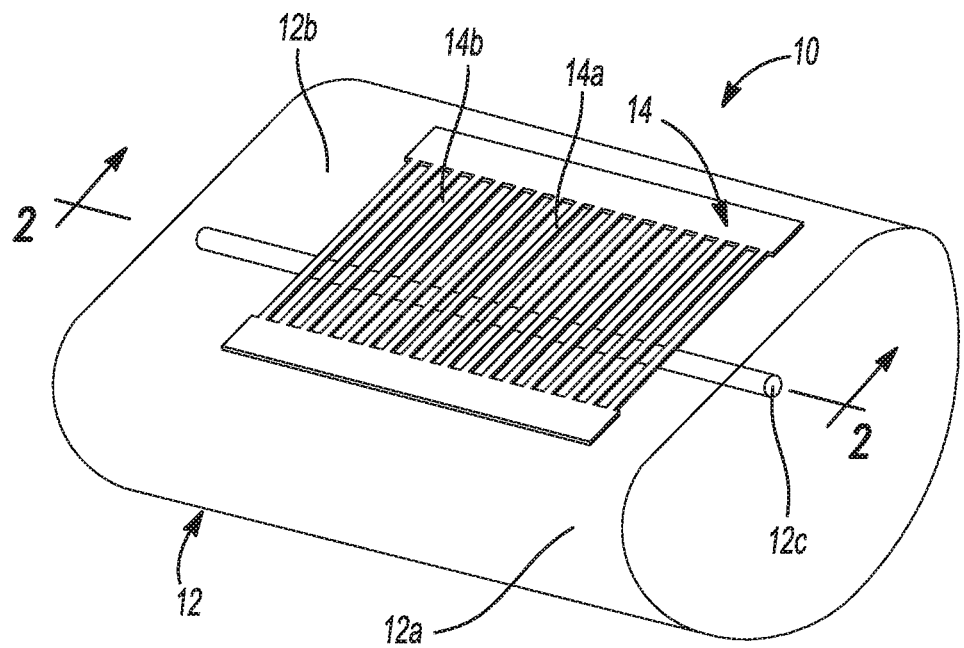
FIG. 1 is a high level perspective view of one embodiment of a system in accordance with the present disclosure illustrating a portion of an optical fiber having a metallic plasmonic device patterned thereon.
Figure 2:
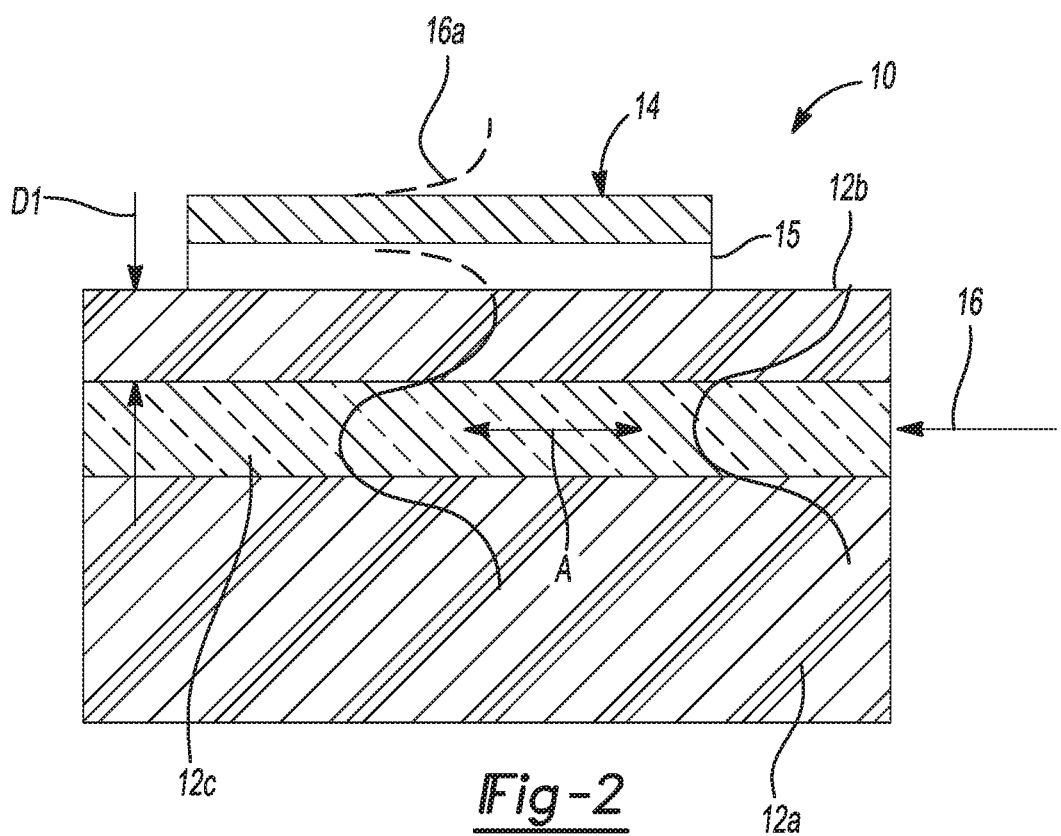
FIG. 2 is a simplified side cross sectional view of the optical fiber of FIG. 1.

Referring to FIGS. 1 and 2, a system 10 in accordance with one embodiment of the present disclosure is shown. In this example the system 10 may comprise a length of D-shaped optical fiber 12 having a cladding 12a with a flat surface portion 12b, and a core-guide 12c encased within the cladding 12a. The core-guide 12c is a glass fiber that enables a core-guide mode when an optical input signal 16 is input into the core-guide 12c. A relatively thin metal layer 14 is secured or formed on the flat surface portion 12b of the cladding 12a. The thin metal layer 14 forms a plasmonic device (hereinafter "plasmonic device 14"), which supports a plasmonic mode when the optical signal 16 is travelling through the core-guide 12c.

In the D-shaped optical fiber 12 such shown in FIGS. 1 and 2, the core-to-fiber surface distance is reduced in a specific region, as indicated by dimension D1 in the side cross sectional view of FIG. 2, enabling the enhanced coupling to the plasmonic device 14. The thin metal layer which forms the plasmonic device 14 may be, for example, constructed from, for example and without limitation, gold (Au), silver (Ag) or copper (Cu), and be on the order of between about tens of nanometers to hundreds of nanometers in thickness, or possibly even thicker. In this example the plasmonic device 14 forms an integrated, lattice-like structure having a plurality of spaced apart strips 14a which form grooves 14b therebetween. The grooves 14b in this example are formed normal to a longitudinal axis of the core-guide, indicated by line "A" in FIG. 2. The strips 14a in this example may be spaced apart by a distance of up to hundreds of micrometers, or possibly even greater, and each strip has a width that will be selected based on the specific application, in one example up to hundreds of micrometers in width, or possibly even greater. In some applications, the thin metal layer forming the plasmonic device 14 may have no grooves at all. The plasmonic device 14 may be created/applied through any suitable, well-known process, for example, by masked evaporation, sputtering, lithography or even controlled plating. However, it will be appreciated that the precise construction of the plasmonic device 14 may be tailored to a specific application to best achieve specific desired performance or results. The plasmonic device 14 supports a plasmonic local mode (or alternatively a lossy waveguide made with absorbing medium). By modifying the structural properties of the metal layer forming the plasmonic device 14, in connection with the cross sectional D-shape of the optical fiber 12 core structure, and the core spacing (i.e., D1 in FIG. 2), the coupling of optical energy into the plasmonic device 14 from the core-guide 12c can be precisely tuned as the input optical signal 16 travels through the core-guide 12c. In this manner the energy level of the optical signal 16 travelling through the core-guide 12c can be controlled (and will usually depend on the optical frequency), such as, for example, to create a controlled spectral transmission. In one example the controlled spectral transmission may be used to controllably attenuate the optical signal travelling through the core-guide 12c.

Figure 3A:
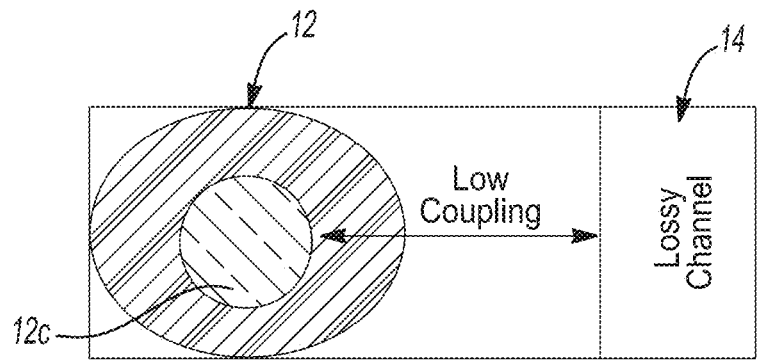
FIG. 3A is a simplified diagram showing an end cross section of the optical fiber of FIG. 1 with low coupling occurring between the core mode and with the lossy channel (i.e., the plasmonic mode/device) at a high intensity.
Figure 3B:
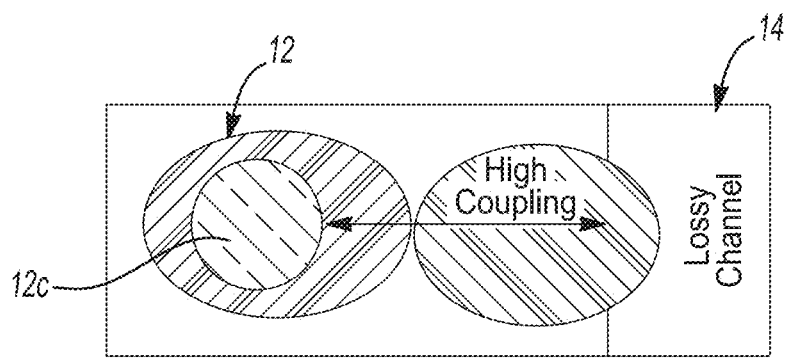
FIG. 3B is a simplified diagram of the optical fiber of FIG. 3A but with a high coupling occurring with the loss channel formed by the plasmonic device at a low intensity.
Figure 3C:
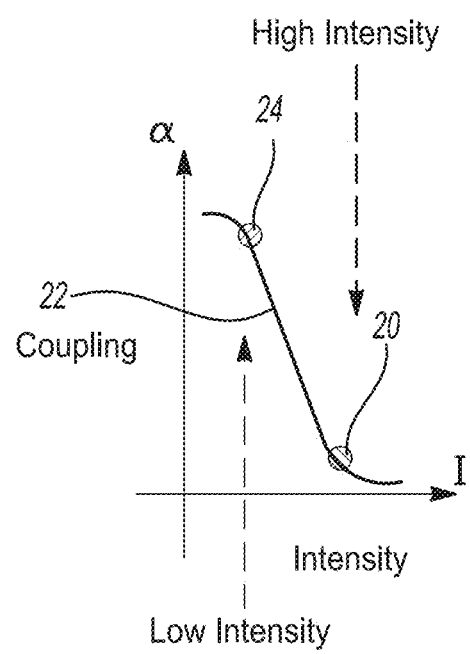
FIG. 3C is a graph illustrating that as the intensity increases, the coupling shown in FIGS. 3A and 3B is designed to be reduced by the change in the nonlinear index in between the two waveguides, thereby resulting in increased transmission for the low intensity parts of the optical pulse.

One valuable application of the system 10 may be as a frequency notch filter. The propagation in an optical fiber could be simplistically viewed in a ray optics description as a ray zig-zag bouncing inside the fiber due to total internal refractions. At each frequency the ray propagation angle is different (representative of the waveguide modal wavenumber, k-vector). The curve that details the k-vector of the propagating mode as a function of the frequency is the dispersion curve characterizing the waveguide. The metal layer forming the plasmonic device 14 (i.e., being a plasmonic waveguide) has a different dispersion curve than that of the fiber core (i.e., the core-guide mode 12c). When the two waveguides (i.e., plasmonic device 14 and core-guide 12c) are put close together, the coupling between their modes is created, and at certain frequencies the angle of propagation of the two matches better, which results in enhanced coupling (i.e., more optical energy transferred to the plasmonic device 14, as indicated by waveform 16a in FIG. 2). At the frequency of enhanced coupling to the plasmonic mode (i.e., the plasmonic device 14), the attenuation of the propagating mode will therefore be enhanced, resulting in a notch filter. Since the notch location depends on structural properties, this sets the basis for a pulse spectrum reshaping scheme by cascading two or more filters. By tuning the difference between the wave-vector resonance of the plasmonic waveguide formed by the plasmonic device 14 and that of the fiber waveguide formed by the core-guide mode 12c, and setting the nonlinearity in the coupling of the two such that there is less coupling (thus less loss) when the intensity increases, fast pedestal suppression function (at the speed of the nonlinear effect) can be achieved. In this regard it will be appreciated that the "pedestal" referred to represents the lower intensity parts of the pulse away from its central peak. The fast pedestal suppression is shown in FIG. 3C. FIG. 3C also shows that at high intensity, indicated by point 20, for the coupling of FIG. 3A, fast pedestal suppression is achieved. As shown in FIG. 3B, to achieve pedestal suppression function, the coupling at low intensity is set to be high, resulting in a low transmission from the core-guide mode 12c to the plasmonic device 14. As the intensity increases, the coupling, "α", is designed to be reduced by the change in the nonlinear index between the two waveguides—resulting in increased transmission, as shown in FIG. 3C by the curve 22 and the difference between the low intensity point 24 and the high intensity point 20. The system 10 is thus implementing a pedestal suppression function, and the details of the function are being set by the nonlinear optical coupling scheme between the two waveguides formed by the core-guide 12c and the plasmonic device 14. Such a "passive optical valve" component can improve the contrast between the "ON" state and the noise level. The nonlinearity would result from the deposited nonlinear material layer 15 making up the plasmonic device or from the metal nonlinearity itself. This concept of designing a nonlinear optical transmission function to an optical fiber segment could be further explored to obtain other complex transmission shapes, for example by depositing plasmonic cavities onto the flat surface of the D-shaped fiber instead of a uniform thickness metal layer, which adds dispersion curve resonances. An additional example is a saturable absorber function resulting in a flat top shaped pulse.

The above teachings for designing the nonlinear transmission could be further extended to affecting the accumulated phase. Similar to how spatially modifying the index (e.g., lens), and thus spatially the accumulated phase, could reshape the light spatially, temporal reshaping of the phase could reshape the pulse in time. The coupling between the two waveguides formed by the core-guide 12c and the plasmonic device 14 modifies the intensity profile and, due to the optical nonlinearity, results in a modified refractive index. The net modal index (related to the phase accumulation of the propagating mode) could be estimated as the overlap integral of the modified refractive index and the field distribution shape. Therefore to obtain a negative b-integral, more energy should be guided at lower refractive index parts of the waveguide (clad) at higher intensities. This is a non-typical material response that could be designed into the system 10 using the structural approach developed above. In this scheme, the coupling and the nonlinearity in the plasmonic device 14 (i.e., effectively the plasmonic 'cladding') may be designed such that at high intensity, more power is wave-guided at lower net index, which results in a negative Kerr effect and allows for a b-integral compensator for a laser system's front-end. The main existing solutions for front-end pulse shaping with sufficiently fast response presently suffer from being based on bulk components and limited by properties of a given set of available materials. For example, a b-integral compensator could be implemented using KTP crystal near the phase matching angle (through a cascaded khi-2 nonlinearity). The system 10, modified as described above, would have the advantage of being an in-fiber integrated device, and have the wavelength configurability based on the design.

Figure 3D:
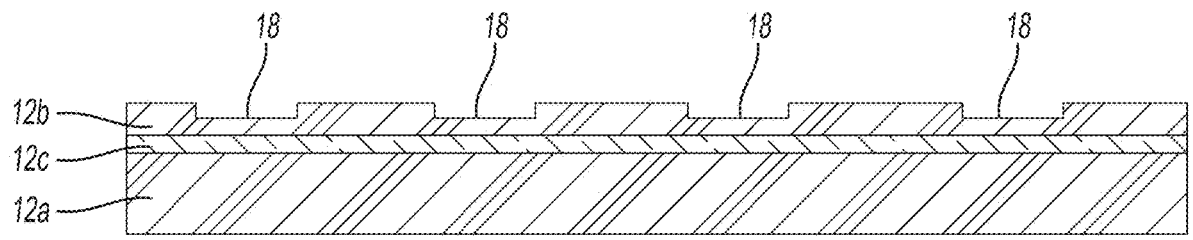
FIG. 3D shows an another embodiment of the system of FIG. 1 in which resonant cavities are formed on the flat surface of the D-shaped optical fiber at spaced apart locations along the length of the optical fiber.

Still another function that could be tailored using the system 10, which forms plasmonic fibers, is unique fiber dispersion. As shown in FIG. 3D, this optional configuration could be achieved by forming resonant cavities 18 deposited onto the flat surface 12b of the D-shaped fiber 12, and could be even further enhanced by strong coupling of plasmonic structures and cavities with excitons in dye molecules and quantum dots. In one example, the dye molecules are lossy at a given narrow band wavelength, and could replace the metal material as the lossy media, or alternatively could be added to it, to thus reshape the response.

Figure 4:
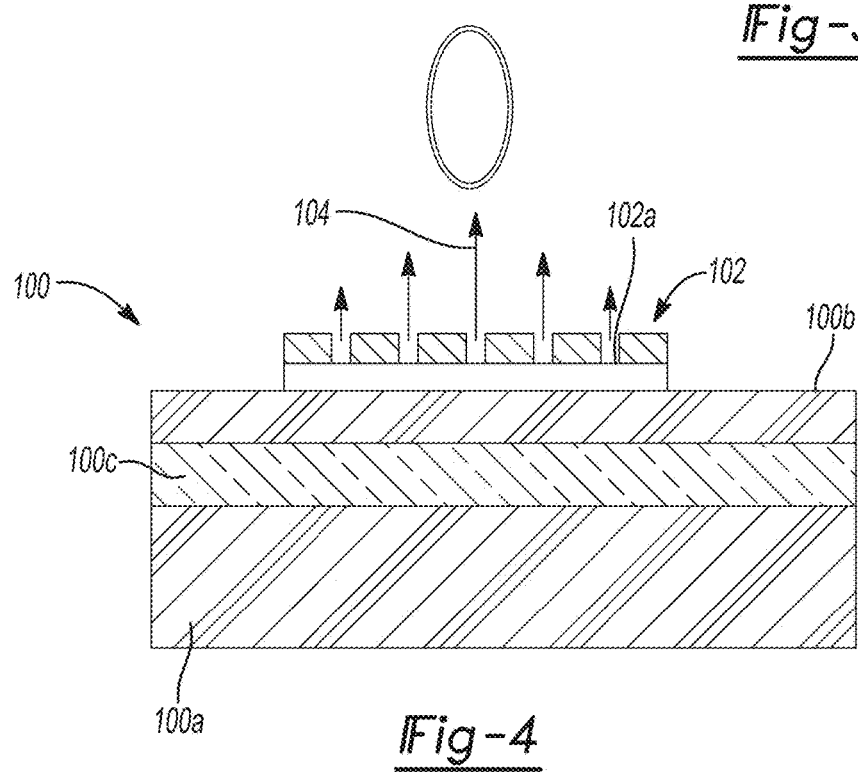
FIG. 4 shows a side view of another embodiment of the system of the present disclosure in which a plasmonic device formed by a metallic portion with a plurality of grooves extending normal to the length of the optical fiber may be used to form a side emitting optical fiber.
Figure 5:
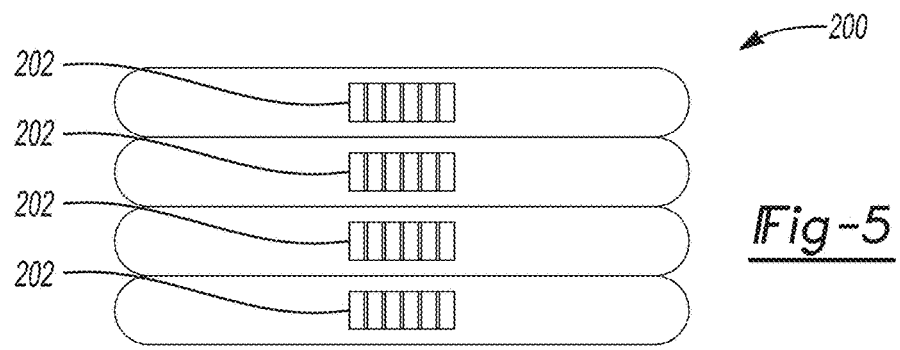
FIG. 5 shows another embodiment of the present disclosure in which an optical fiber is arranged in a coiled configuration with a plurality of aligned, side emitting segments metal segments disposed thereon, which can be used to create a two dimensional array of coherently added lasers with a total emitter area much larger than the optical fiber core.

An efficient coupling scheme between the plasmonic mode and free space far-field would result in a side emitting optical fiber 100, as shown in FIG. 4. The optical fiber 100 includes a cladding 100a having a core-guide mode 100c and an outer surface portion 100b. A carefully designed sub-wavelength metal array 102, having grooves 102a, is known to enable a maximum constructive interference in the far-field, that is, in the direction normal to the optical fiber 100 (i.e., indicated by arrows 104), which has been demonstrated for laser diodes facets. Optionally, the angle may be tuned as needed to meet a specific application; in other words the angle does not have to be normal to the optical fiber 100. The side emitting plasmonic section formed by the metal array 102 could be repeated along the length of the optical fiber 100 to create an array of emitters for emitting optical energy. Furthermore, each emitter could exhibit a different phase in a controllable way, resulting in a phased array controlled beam. FIG. 5 shows an embodiment of an optical fiber 200 coiled with a plurality of aligned, side emitting segments metal segments 202 for emitting optical energy, such as shown in FIG. 4, which form plasmonic devices. Coiling of the optical fiber 200 creates a two dimensional array of coherently added lasers, with total emitter area much larger than the area of the fiber core-guide 12c.

Figure 6:
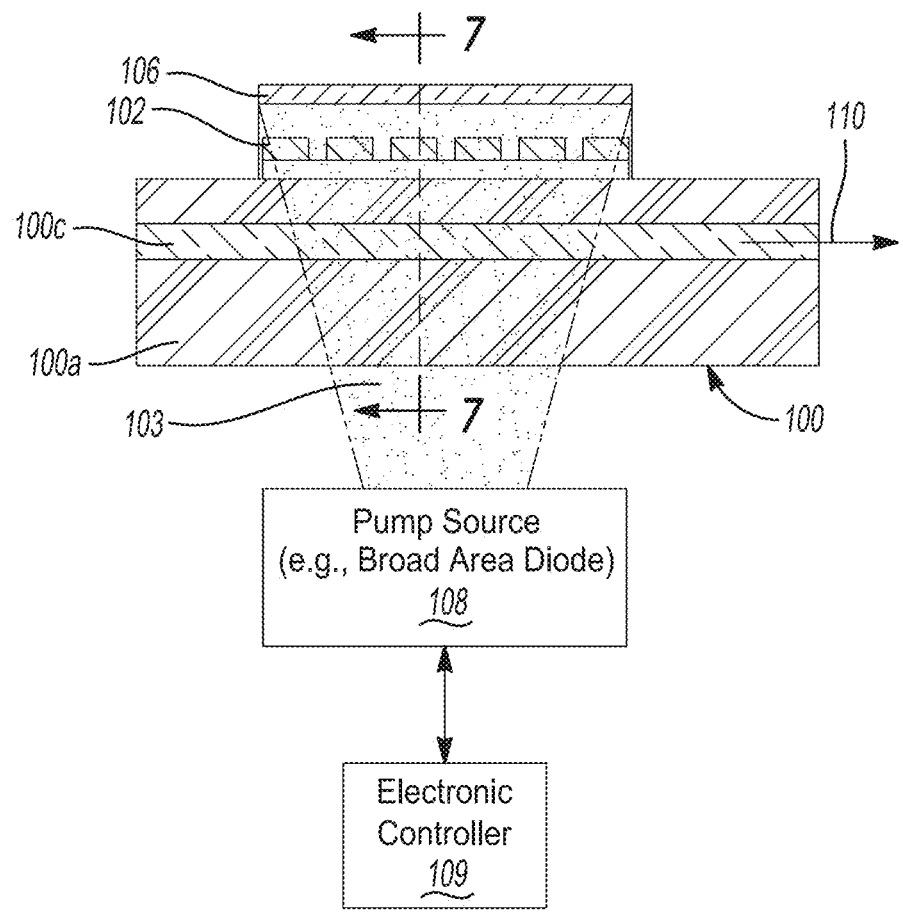
FIG. 6 shows another embodiment of the present disclosure in which the optical fiber of FIG. 4 (shown in simplified side view in FIG. 6) is used in connection with a broad area diode and a mirror positioned normal to the axis of propagation of an input wave through the core-guide mode, to enable optical energy to be coupled into the common-mode guide of the optical fiber.
Figure 7:
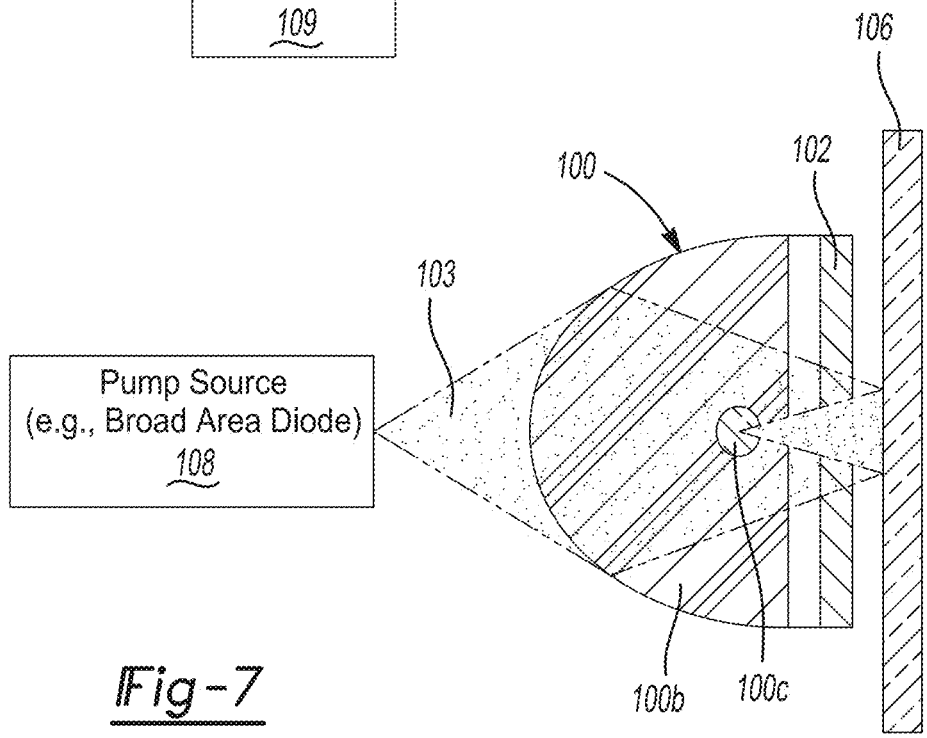
FIG. 7 is a simplified end cross sectional view of the optical fiber and mirror of FIG. 6.
Figure 8:
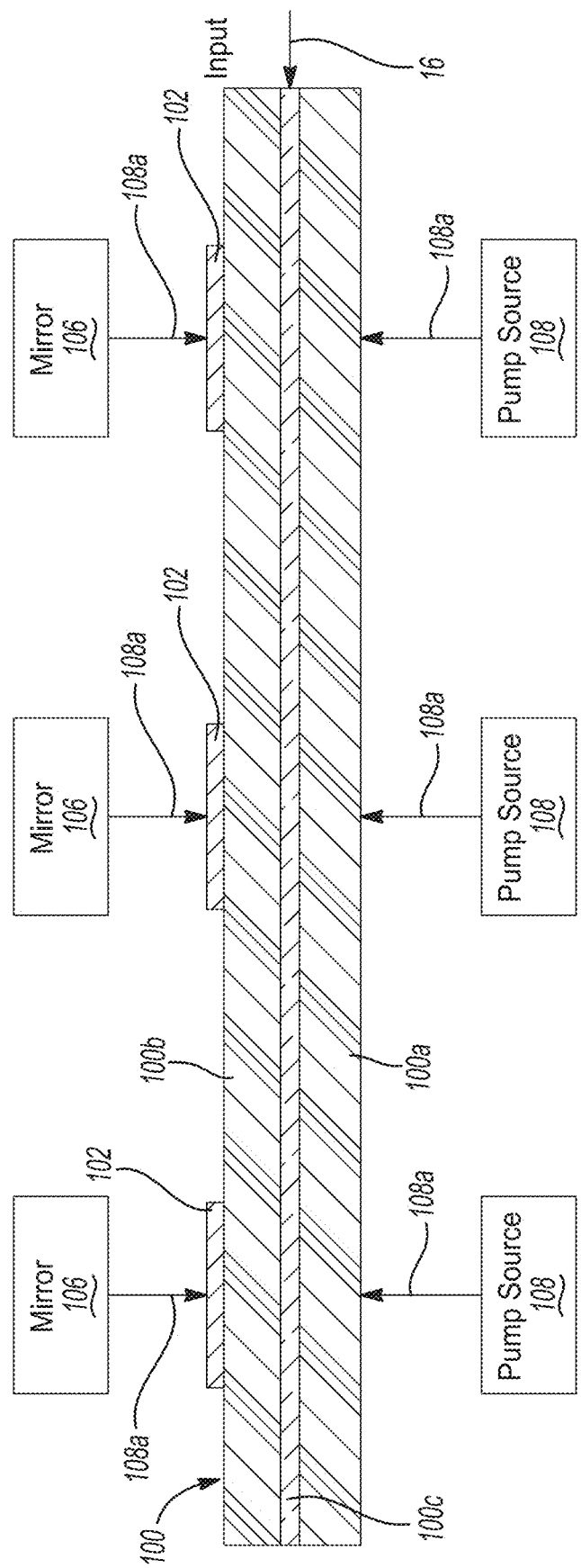
FIG. 8 is a simplified side view of another embodiment of the present disclosure showing a plurality of pump sources (e.g., broad area diodes) used to provide pump beams which are coupled into the core-guide of an optical fiber at a plurality of locations along the length of the optical fiber.

Another potential modification may be the addition of a mirror 106, as shown in FIGS. 6 and 7, near the side emitter of the metal array 102. The lens-like shape of the D-shaped fiber cross-section cladding 100a of the optical fiber 100 may be used to couple the normal-to-fiber radiation 103, from a pump source 108, for example a broad area diode laser, which is controlled by an electronic controller 109, into a fiber propagating mode (i.e., into a core-guide mode). Broad-area laser diodes have been recently proposed to set attractive pumping sources for fiber lasers due to their relatively high power (~10 W). The fiber coupled broad area diode configuration shown in FIGS. 6 and 7 is expected to be of high interest as a pumping scheme since it allows coupling of the pump light from one or more optical pump sources into the longitudinally propagating light 110 in the core-guide 100c of the optical fiber 100. This configuration furthermore enables combining the power of several pump sources 108 providing optical pump energy 108a at spaced apart locations along the length of an optical fiber 100, as shown in the embodiment of FIG. 8. Surface emitting fiber lasers have been suggested in previous work but have typically involved using a complex structure of hollow core fiber filled with a gain medium and radial dielectric multilayer side walls. The system shown in FIG. 6 is constructed with significantly fewer component elements and allows for spatial control of the emitted beam.

The various embodiments described herein enable control over optical fiber properties by patterning a plasmonic structure (or plasmonic structures) directly onto optical fibers. Using the strong light-matter interaction of plasmonics enables the design of unique pulse shaping functions and/or filtering to be achieved, as well as allowing for the construction of side emitting and pumping of fiber lasers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An optical waveguide system including:
a first waveguide having a core-guide and a cladding material portion surrounding and encasing the core-guide to form a substantially D-shaped cross sectional profile with an exposed flat section running along a length thereof, the core-guide enabling a core-guide mode for an optical pulse signal having a first characteristic, travelling through the core-guide; and
a material layer of non-linear material forming a second waveguide, the material layer forming a lossy layer and being disposed on the exposed flat section of the cladding material portion, the material layer forming a plasmonic device to achieve a desired non-linear coupling with the core-guide to couple optical energy travelling through the core-guide into the material layer, which modifies the optical energy travelling through the core-guide to cause the optical energy travelling through the core-guide to have a second characteristic different from the first characteristic, and such that the non-linear coupling creates a fast pedestal suppression function for the optical pulse.

2. The system of claim 1, wherein the first characteristic comprises a first energy level, and the second characteristic comprises a second energy level, and wherein the first and second energy levels differ from one another.

3. The system of claim 1, wherein a plurality of the second waveguides are disposed along a length of the optical fiber.

4. The system of claim 1, further comprising an additional plasmonic device forming a lattice like structure having a plurality of spaced apart strips held in an arrangement with a fixed spacing, the additional plasmonic device being disposed on a surface of the material layer.

5. The system of claim 4, wherein the spaced apart strips form grooves therebetween.

6. The system of claim 5, wherein the grooves are further formed normal to a longitudinal axis of the core-guide.

7. The system of claim 1, wherein the core-guide is arranged in a coil, and wherein the second waveguide includes a plurality of independent plasmonic devices aligned adjacent to one another on the outer surface, which collectively form a two dimensional emitter.

8. The system of claim 1, wherein the second waveguide is constructed from at least one of:
copper;
gold; and
silver.

9. A surface emitting optical fiber including:
an optical fiber having a core-guide and a cladding material portion surrounding and encasing the core-guide, the core-guide forming a first wave-guide and enabling a core-guide mode for an optical signal having a first pulse profile travelling through the core-guide;
a second waveguide forming a lossy waveguide, the second waveguide being secured to an outer surface of the first waveguide, the second waveguide forming a plasmonic device which implements a plasmonic mode waveguide;
the construction of the second waveguide creating a desired level of non-linear coupling between the core-guide mode and the plasmonic mode waveguide such that optical energy coupled into the second waveguide has a second pulse profile being different from the first pulse profile, which is emitted out from the second waveguide, and further such that that the second waveguide creates a fast pedestal suppression function for the optical signal travelling through the core-guide.

10. The system of claim 9, wherein the cladding material portion comprises a D-shaped profile having a flat portion, and wherein the second waveguide forms a planar element secured to the flat portion.

11. The system of claim 10, further comprising an additional plasmonic device forming a lattice like structure having a plurality of spaced apart strips held in an arrangement with a fixed spacing, the additional plasmonic device being disposed on the flat portion of the D-shaped profile.

12. The system of claim 9, further comprising a plurality of the second waveguides disposed along a length of the cladding material portion and spaced apart from one another.

13. The system of claim 12, wherein the cladding material portion is arranged in a coil, and ones of the plurality of second waveguides are arranged to be aligned along the coil.

14. A method for transmitting optical energy comprising:
injecting optical energy forming a pulse having a first temporal pulse profile into a core-guide of an optical fiber, the core-guide forming a first waveguide, and the optical fiber having a cladding material portion with a D-shaped profile; and
using a non-linear, lossy material layer secured to the D-shaped profile of the cladding material portion to form a second waveguide, the second waveguide coupling at least a portion of the optical energy out from the first waveguide such that the optical energy travelling through the first waveguide is modified to have a second temporal pulse profile different from the first temporal pulse profile, and such that the non-linear, lossy material layer creates a pedestal suppression function for the second temporal pulse profile.

15. An optical waveguide system including:
a first waveguide having a core-guide and a cladding material portion surrounding and encasing the core-guide to form a substantially D-shaped cross sectional profile with an exposed flat section running along a length thereof, the core-guide enabling a core-guide mode for an optical pulse signal having a first characteristic, travelling through the core-guide;
a material layer of non-linear material forming a second waveguide, the material layer being disposed on the exposed flat section of the cladding material portion, the material layer forming a plasmonic device to achieve a desired coupling with the core-guide to couple optical energy travelling through the core-guide into the material layer, which modifies the optical energy travelling through the core-guide to cause the optical energy travelling through the core-guide to have a second characteristic different from the first characteristic; and
an additional plasmonic device forming a lattice like structure having a plurality of spaced apart strips held in an arrangement with a fixed spacing, the additional plasmonic device being disposed on a surface of the material layer.

16. A surface emitting optical fiber including:
an optical fiber having a core-guide and a cladding material portion surrounding and encasing the core-guide, the core-guide forming a first wave-guide and enabling a core-guide mode for an optical signal having a first pulse profile travelling through the core-guide;
a second waveguide secured to an outer surface of the first waveguide, the second waveguide forming a plasmonic device which implements a plasmonic mode waveguide;
the construction of the second waveguide being such as to achieve a desired level of coupling between the core-guide mode and the plasmonic mode waveguide such that optical energy coupled into the second waveguide has a second pulse profile being different from the first pulse profile, which is emitted out from the second waveguide;
a plurality of the second waveguides disposed along a length of the cladding material portion and spaced apart from one another; and
wherein the cladding material portion is arranged in a coil, and ones of the plurality of second waveguides are arranged to be aligned along the coil.

* * * * *